United States Patent [19]

Blagg

[11] 4,239,439
[45] Dec. 16, 1980

[54] LOG SKIDDER

[75] Inventor: Leon Blagg, Bertram, Tex.

[73] Assignee: Rolligon Corporation, Stafford, Tex.

[21] Appl. No.: 942,473

[22] Filed: Sep. 15, 1978

[51] Int. Cl.³ .............................................. B60P 1/04
[52] U.S. Cl. ................................. 414/494; 414/559;
414/569; 414/571; 212/167
[58] Field of Search .............. 414/494, 569, 571, 559;
212/7; 280/404

[56] References Cited

U.S. PATENT DOCUMENTS

| 2,131,402 | 9/1938 | King | 212/7 |
|---|---|---|---|
| 2,321,198 | 6/1943 | Graves | 414/494 |
| 2,869,741 | 1/1959 | Winters et al. | 414/569 |
| 3,549,029 | 12/1970 | Rutter | 280/404 |
| 3,741,526 | 6/1973 | Kasin et al. | 414/559 |
| 4,051,968 | 10/1977 | Massey | 414/559 |

FOREIGN PATENT DOCUMENTS 167105  3/1959  Sweden ................................... 414/559

*Primary Examiner*—Lawrence J. Oresky
*Attorney, Agent, or Firm*—Arnold, White & Durkee

[57] ABSTRACT

In accordance with illustrative embodiments of the present invention, a new and improved log skidder comprises a motorized vehicle, log carrier means pivotally attached at a point directly above the rear wheels thereof, first means such as a winch for pulling a log toward said carrier means and disposing portions of the log and the carrier means in overlapping relation, and second means such as a winch or a grapple for securing said overlapping portions together as a substantially rigid assembly, whereby the weight of the forward portion of the log is supported directly above the rear wheels of said vehicle.

13 Claims, 4 Drawing Figures

LOG SKIDDER

This invention relates generally to log skidding vehicles, and particularly to a new and improved handling attachment for a skidder providing optimum load distribution on the tires of the vehicle as the ends of the logs are picked up and while the logs are in tow.

Log skidders are off-the-road vehicles used in timber harvesting operations to move newly cut trees from the cutting site to a transport terminal or landing. Several types of skidders are well-known. One type has a winch with the cable leading over a sheave on a tilted A-frame mounted on the rear of the vehicle. The cable terminates into a sling which is looped around the end of one or more logs so that the ends can be lifted off the ground and the logs dragged along behind the vehicle. Another type of skidder has in addition to the winch and A-frame, a grapple pivotally mounted on a tiltable boom. The grapple is operated through hydraulic controls, and clamps and supports the adjacent log ends during movement over the ground.

Such log skidder designs have several shortcomings. The rearwardly tilted A-frame arrangement supporting the logs during pickup and/or tow generates a moment about the rear axle of the vehicle which tends to raise the front vehicle wheels off of the ground and thus put the predominate load on the rear axle and wheels. This can cause the rear wheels to sink into unstable soil, reduce the tractive effort available from the front wheels, and is otherwise an inefficient and somewhat dangerous situation.

It is the general object of the present invention to provide a new and improved carrier apparatus for a log skidder vehicle which properly distributes the load of the elevated ends of the logs to the vehicle during skidding operations.

This and other objects are attained in accordance with the present invention through the provision of a skidder apparatus comprising a frame pivotally attached to the fifth wheel of a motorized vehicle and extending rearward thereof, a trough secured to the rear portion of the frame, first winch means for positioning the adjacent end portion of a log in overlapping relationship with the trough, and second winch means for pulling the trough firmly against the bottom of the log, whereby the log, trough and frame become a substantially rigid assembly as the log is skidded over the ground and the weight of the log that is carried by the vehicle is supported solely at the fifth wheel.

The present invention has other objects and advantages which will become more clearly apparent in connection with the following detailed description of a preferred embodiment, taken in conjunction with the appended drawing in which.

Figure 1:
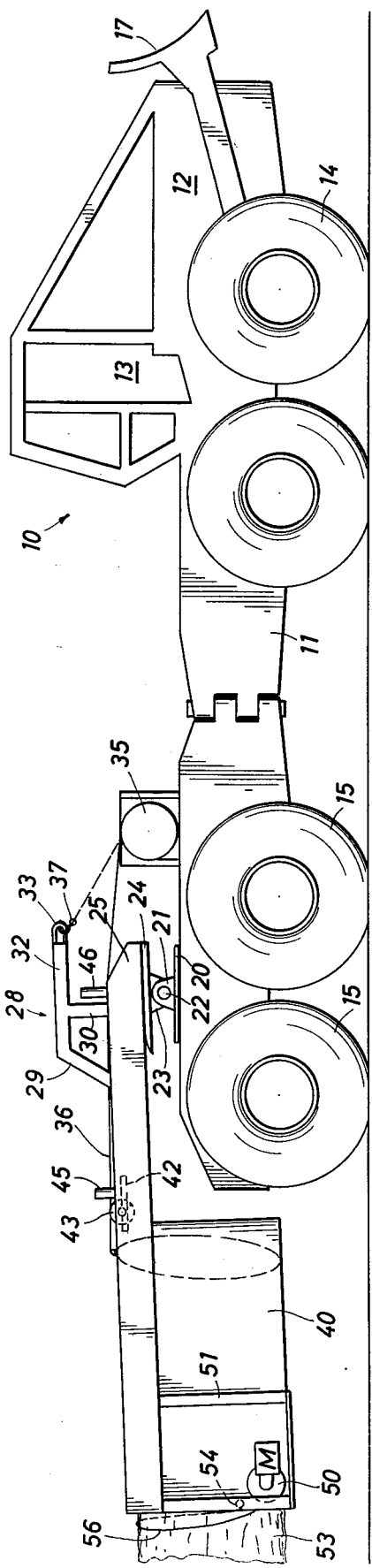
FIG. 1 is a somewhat schematic side view of a log skidder constructed in accordance with the present invention.

Referring initially to FIG. 1, a log skidder constructed in accordance with the principles of the present invention includes a vehicle 10 having a frame 11 supporting an engine 12 and a driver's station 13. Front and rear wheels 14 and 15 engage the ground and preferably are low pressure pneumatic tires of the type disclosed in Albee U.S. Pat. Re. No. 24,272 to adapt the vehicle for all-terrain operation. The wheels 14 and 15 are mounted on conventional axles coupled to the frame and may all be driven by the engine 12 via typical differentials, drive shafts and a transmission (not shown). Steering may be accomplished by an articulated frame arrangement providing a vertical pivot axis and a longitudinal horizontal roll axis, together with hydraulic cylinders as shown in Holland, U.S. Pat. No. 3,630,302, assigned to the assignee of this invention and incorporated herein by reference. A hydraulically controlled blade 17 may be mounted on the front end of the vehicle 10 for pushing logs into appropriate positions for skidding, as well as other utilitarian purposes. Although an eight wheel arrangement is shown in the drawing, other arrangements such as four or six wheels could be used.

Figure 2:
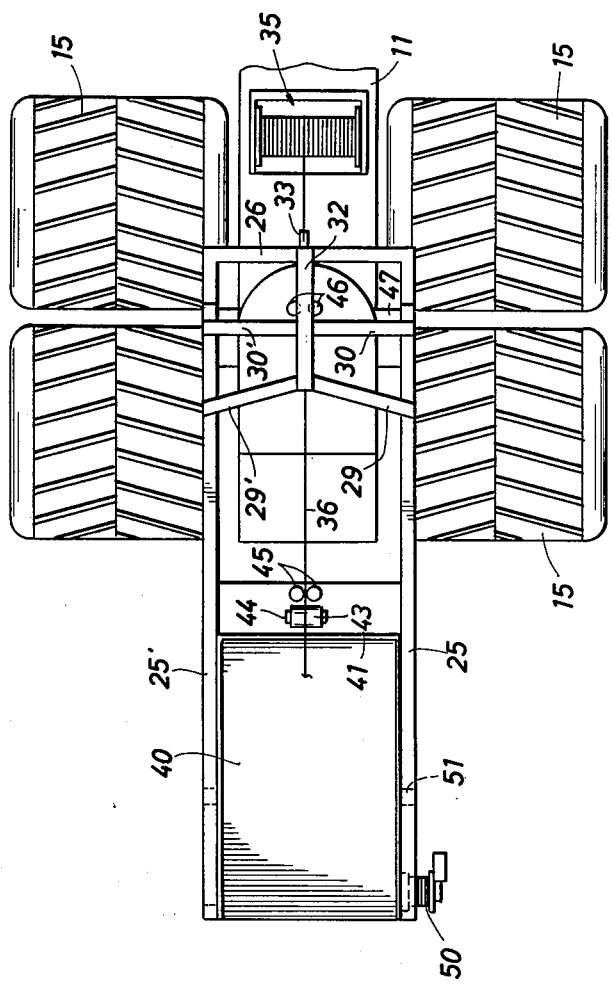
FIG. 2 is a top view of the skidder attachment to the vehicle of FIG. 1.

A fifth wheel assembly 20 is mounted on the frame 11 with the upper member having spaced-apart brackets 21 retaining a transverse pivot pin 22. The pin 22 extends through brackets 23 attached to the lower side of a plate 24 to provide an assembly with capability for pivotal rotation about a horizontal axis defined by the pin 22 and a vertical axis passing through the center of the fifth wheel 20. Such vertical axis preferably is located either equidistant between the axles of the rear wheels 15, or located somewhat toward the front rear axle. The plate 24 is secured to the forward end portions of two rearwardly extending and laterally spaced beams 25 and 25' joined together by a cross-brace 26 as shown in FIG. 2. An arm assembly 28 includes legs 29, 29' and 30, 30' having their lower ends welded to the beams 25 and 25' and their upper ends welded to a beam 32 located well above the pivot pin 22 and having an eye 33 on the forward end thereof. A winch 35 is rigidly mounted on the frame 11 of the vehicle 10 in front of the fifth wheel assembly 20 and is hydraulically controlled from the operator's station 13 in a typical manner to take in or pay out a cable 36 wound thereon. In a travelling position when a log is not being skidded, a hook 37 on the end of the cable 36 may be coupled to the eye 33 so that the winch 35 is set to maintain the frame 25 in an approximate horizontal position.

As shown in FIGS. 1 and 2, the rear portions of the beams 25 and 25' have an elongated trough 40 carried thereby. The trough has an open top and rear end, and may have a curved bottom, although the particular shape of the bottom is a matter of design choice. The front of the trough 40 is closed by an end plate 41, and a cross-member 42 welded between the beams carries a horizontally disposed roller 43 that is mounted on bearing blocks 44. The member 42 also carries a pair of upstanding guide rollers 45 spaced closely together to maintain the cable generally aligned with the longitudinal axis of the carrier. Another set of guide rollers 46 are mounted on a cross-member 47 near the front ends of the beams 25 in alignment with the vertical pivot axis of the fifth wheel 20.

A second winch 50, also hydraulically controlled from the operator's station 13, is mounted on a suitable frame 51 that is secured to the rear portions of the beams 25 and 25' in such a manner as to position the winch near the bottom and to the side of the trough 40. The cable 52 wound on the winch 50 may be passed through a guide (not shown) and is adapted to be layed upward and over the top of a log 53 where a hook 54 on the end of the cable can be releasably connected to an eye 55 on the opposite side of the trough 40.

In operation, the operator backs the vehicle 10 up as near as possible to the rear end of the log 53 and lets out the cable 36 from the winch 35 to lower the rear end of the carrier trough 40 onto the ground. The cable 36 then is released from the eye 33 and is fed through the spaced sets of guide rollers 46 and 45 and over the roller 43. The cable is secured to the end portion of the log in a typical manner, and is then winched in to drag the log toward the trough 40. Note that the spaced arrangement of the guide rollers 45 and 46 along the longitudinal axis of the frame 25, together with the location of the front pair of rollers 46 to either side of the fifth wheel pivot axis, causes the trough 40 to be automatically aligned with the log 52 as the cable 36 is tensioned during winch-in. Moreover, the same arrangement provides capability of log pickup with the carrier assembly pivoted up to at least 90° to either side of the vehicle 10.

The front portion of the log 53 is dragged into the trough 40 so that the log and trough are in overlapping relationship as shown in FIG. 1. The cable 52 from the rear winch 50 then is fed over the top of the log and its hook 54 secured to the eye 55. This cable 52 then is winched in to snub the trough 40 tightly against the bottom surface of the log 53 so that the trough, frame, and log in effect form a long rigid assembly. In such configuration, the log is skidded away to the landing. The entire weight of the log which is carried by the vehicle 10 is disposed directly on the fifth wheel assembly 20 which is located above the rear wheels 15. Such weight is thus distributed substantially evenly to these wheels, and in any event there is no moment that would tend to raise the front wheels 14 of the vehicle 10 off of the ground.

Figure 3:
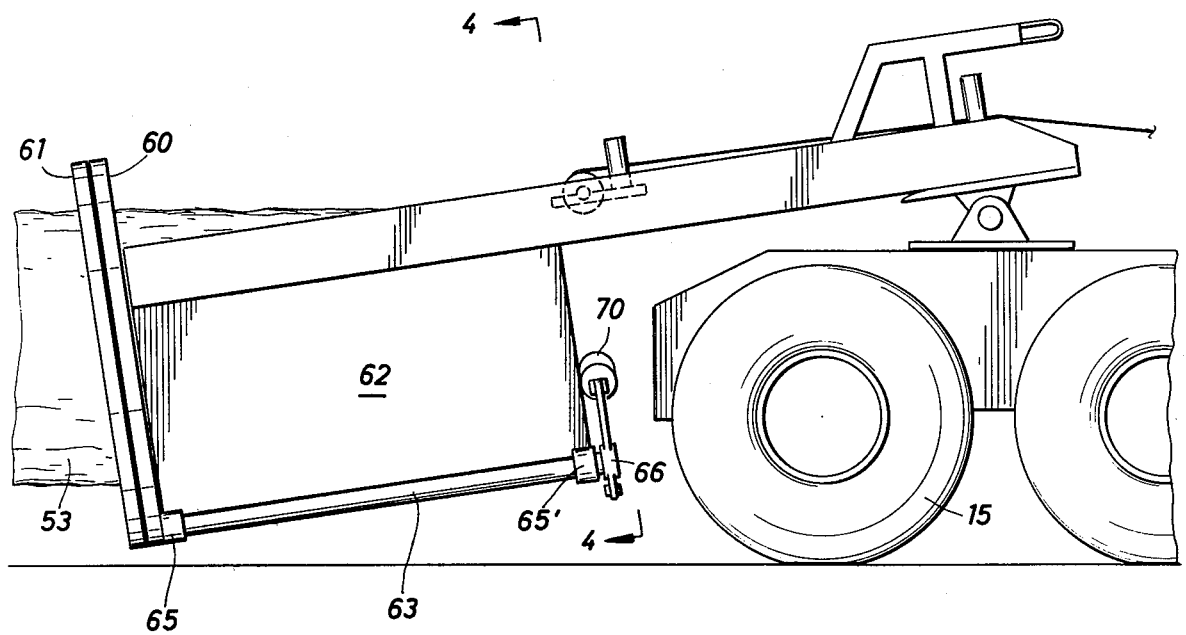
FIG. 3 is a side view of another embodiment of the present invention.
Figure 4:
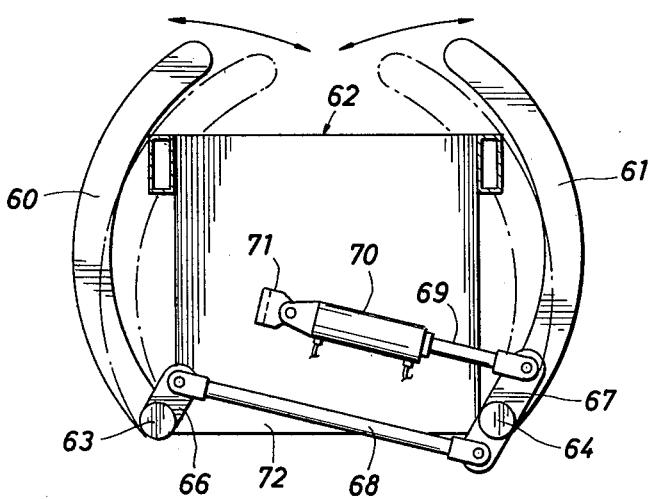
FIG. 4 is a cross-section taken on line 4—4 of FIG. 3.

Another embodiment of the present invention is shown in FIGS. 3 and 4. Arcuate grapple arms 60 and 61 are mounted at the rear of the carrier on torsion rods 63 and 64 that extend along the lower opposite sides of the trough 42. Each rod passes through spaced bearing blocks 65, 65', and the forward ends of the rods are connected to respective pivot arms 66 and 67. The lower end of the pivot arm 67 is connected to the upper end of the arm 66 by a cross linkage 68, whereas the upper end of the arm 67 is connected to the rod 69 of a double acting hydraulic cylinder 70 pivotally coupled to a base 71 which is secured to the end plate 72 of the trough 62.

Extension of the rod 69 from the cylinder 70 under remote control from the driver's station will cause the grapple arms 60 and 61 to open, enabling the end of the log 53 to be winched into the trough 62 via the cable 36. Then the rod 69 is retracted into the cylinder 20 to cause the grapple arms to close about the log, pulling the trough snuggly against the bottom of the log. This secures the log and carrier together as a rigid assembly, whereby the load due to the forward part of the log is carried by the fifth wheel 20. As in the previous embodiment shown in FIGS. 1 and 2, the cable 36 passes through the spaced roller guides 46 and 45 so that the carrier will be automatically aligned with the axis of the log 53 as the log is being pulled toward the vehicle 10.

It now will be recognized that a new and improved log skidding attachment for an all-terrain vehicle has been provided. The weight of the forward portion of the log (or logs) is distributed substantially uniformly to the rear wheels of the vehicle without application of moment to the frame, providing for optimum traction and vehicle stability. Since certain changes or modifications may be made in the disclosed embodiments without departing from the inventive concepts involved, it is the aim of the appended claims to cover all such changes and modifications falling within the true spirit and scope of the present invention.

I claim:

1. A log skidder apparatus for use with a vehicle having a fifth wheel located over the rear wheels thereof comprising:

log carrier means pivotally attached to said fifth wheel and including are elongated trough extending beyond the rear of said vehicle and adapted to be lowered to a position where a surface thereof rests on the ground;

first means for pulling a log toward said vehicle and disposing portions of said log and said trough in overlapping relationship; and second means for causing said elongated trough to abut the bottom surface of the log thus securing said overlapping portions together as a substantially rigid assembly with said surface off of the ground, whereby during skidding the weight of the log that is supported by the vehicle is carried solely at the fifth wheel, and the rear end of said log is skidded on the ground.

2. The apparatus of claim 1 wherein said elongated trough has an open rear end adapted to receive the end portion of said log, said second means comprising means for pulling said trough against the bottom of said log.

3. The apparatus of claim 2 wherein said second means includes a winch having a cable adapted to be extended over the top of the log and secured to a point near the bottom surface of said trough.

4. The apparatus of claim 2 wherein said second means includes arcuate grapple arms pivoted to either side of said trough near the lower portion thereof and extending upwardly, and means for pivoting said grapple arm toward each other.

5. The apparatus of claim 1, wherein said first means comprises a winch mounted on said vehicle and having a cable extendable rearwardly along said carrier means for connection to said log.

6. The apparatus of claim 5 further including longitudinally spaced guide means on said carrier means, one of said guide means being located directly above said fifth wheel and another of said guide means being located rearwardly of said one guide means, whereby said carrier means automatically is aligned with the log in response to tension in said cable as the log is pulled toward said vehicle.

7. The apparatus of claim 6 further including roller means adjacent said other guide means, said cable passing over said roller means.

8. A log skidder attachment adapted for use with a vehicle having front and rear ground engaging wheels and a fifth wheel means located above said rear wheels, comprising:

an elongated frame having a forward portion and a rearward portion;

coupling means on said forward portion for coupling said frame to said fifth wheel means, said coupling means providing for pivotal rotation about a horizontal pivot axis intersecting the vertical pivot axis of said fifth wheel means;

elongated carrier means on said rearward portion of said frame and extending beyond the rear of said vehicle, said carrier means having adapted to be lowered to an inclined position where a rear surface thereof rests on the ground, said carrier means in said inclined position being adapted to receive the end portion of a log in overlapping relationship;

first means for pulling said log end portion onto said carrier means; and second means for pulling said carrier means upwardly against a bottom surface of said log end portion and for securing said end portion and carrier means together as a substantially rigid assembly, said frame and carrier means being pivoted about said horizontal pivot axis by the pulling of said carrier means against said bottom surface to raise said rear surface off of the ground, whereby the vertical component of the weight of said log that is carried by said vehicle coincides with the vertical pivot axis of said fifth wheel means, and the rear and of said log is skidded on the ground.

9. The log skidder attachment of claim 8 wherein said first means comprises winch means on said vehicle having a cable adapted to be secured to said log end portion.

10. The log skidder attachment of claim 9 further including first cable guide means on said frame for causing the path of said cable to intersect said vertical pivot axis, and second cable guide means on said frame located rearwardly of said first cable guide means and coacting with said cable in a manner such that tension in said cable as said log end portion is pulled toward said carrier means automatically aligns said frame and carrier means with said log.

11. The log skidder attachment of claim 10 further including roller means mounted on said frame adjacent said carrier means for directing said cable along said frame.

12. The log skidder attachment of claim 8 wherein said second means comprises winch means mounted adjacent said carrier means at one lower rear side thereof and having a cable adapted to be passed over the top of said log end portion and secured to a point on the other lower rear side thereof.

13. The log skidder attachment of claim 8 wherein said second means comprises a pair of arcuate grapple arms, one grapple arm being pivotally mounted on one lower rear side of said carrier means and the other grapple arm being pivotally mounted on the other lower rear side thereof, and means for opening and closing said grapple arms.

* * * * *